May 12, 1964 D. L. JAFFEE ETAL 3,133,246
MICROWAVE FREQUENCY X-RAY DIFFRACTION SIMULATOR
Filed Jan. 16, 1962 3 Sheets-Sheet 1

SCATTERED AMPLITUDE $f(\theta)$ vs. $\theta$ FOR $Na^+$ ION 1.540 Å AND HOMOGENEOUS DIELECTRIC SPHERE WITH $R_0R=1.8$ $Na^+$ ―――――

SPHERE ― ― ― ― ―

INVENTOR.
DAVID LAWRENCE JAFFE
JEROME K. PERCUS
BY Darby & Darby
ATTORNEYS

May 12, 1964     D. L. JAFFEE ETAL     3,133,246
MICROWAVE FREQUENCY X-RAY DIFFRACTION SIMULATOR
Filed Jan. 16, 1962     3 Sheets-Sheet 2

COMPARISON OF ATOMIC SCATTERING FACTOR FOR $Na^+$ & $Cl^-$ IONS $Na^+$ — — — — — —
$Cl^-$ ————————
$Cl$ (NORMALIZED TO SAME SCALE AS $Na^+$) - - - - - -

INVENTORS
DAVID LAWRENCE JAFFE
JEROME K. PERCUS
BY Darby & Darby
ATTORNEYS

May 12, 1964 D. L. JAFFEE ETAL 3,133,246
MICROWAVE FREQUENCY X-RAY DIFFRACTION SIMULATOR
Filed Jan. 16, 1962 3 Sheets-Sheet 3

INVENTORS
DAVID LAWRENCE JAFFE
JEROME K. PERCUS
BY Darby & Darby
ATTORNEYS

з,133,246
MICROWAVE FREQUENCY X-RAY
DIFFRACTION SIMULATOR
David Lawrence Jaffee, Great Neck, and Jerome K. Percus, New York, N.Y., assignors to Polarad Electronics Corporation, Long Island City, N.Y., a corporation of New York
Filed Jan. 16, 1962, Ser. No. 166,493
6 Claims. (Cl. 324—58.5)

The present invention relates to apparatus and methods for simulating crystal diffraction of X-rays by utilizing electromagnetic radiation of wavelengths much longer than X-ray wavelengths.

X-ray diffraction techniques are widely used to study the structure of chemical compounds and particularly to study crystal structures and as a tool in organic chemical analysis. The determination of the molecular structure responsible for a particular X-ray diffraction pattern can be a very tedious problem, particularly in the case of complex crystal structures.

It is a major purpose of the present invention to eliminate the necessity for some of the more tedious computation previous required in such analysis by providing a simulated crystal structure wherein the simulated "atoms" have dimensions on the order of centimeters and further arranging that the radiation diffracted by the simulated crystal structure is similarly scaled upward in wavelength with respect to X-ray wavelengths.

In addition to providing the above features and advantages, it is an object of the present invention to provide an apparatus and method for generating an electromagnetic radiation diffraction pattern simulating in relative amplitudes in specific directions the X-ray diffraction pattern of a real or hypothecated crystal, but with the wavelength of the radiation and the dimensions of the crystal structure greatly increased in scale from X-ray wavelengths.

It is another object of the present invention to provide such an apparatus and method wherein the simulated atom structure provided comprises spherical bodies of dielectric material substantially reproducing the scattering characteristics of the atoms of the crystal to be simulated.

Other objects will be apparent from a consideration of the following description in conjunction with the appended drawings in which.

A discussion of X-ray diffraction techniques will facilitate an understanding of the invention. A crystal is a periodic array in three dimensions built up by repetition of a basic building block called the unit cell which may contain one or two atoms (as in cesium chloride) or several thousands (as in a crystal of garnet or a nucleic acid). As crystal is compleley determined by specifying the size, repetition properties, and contents of the unit cell.

Those properties of crystals (particularly X-ray diffraction) which are dependent on the size and repetition characteristics of the unit cell are called geometric properties. The characteristics which are dependent on the components of the unit cell are called structural.

In X-ray diffraction techniques, a substantially plane monochromatic wave is used to irradiate a crystal, so that the wavelength of the radiation is known. Some of this radiation will interact with the crystal and have its direction of propagation changed. This diffracted wave is detected, usually by the use of photographic film where intensity information can be determined from the exposure density.

BRAGG'S LAW

Figure 1:
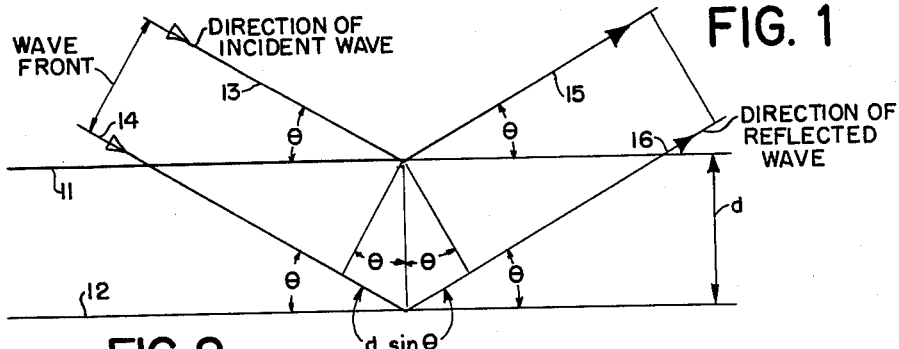
FIGURE 1 is a diagram illustrating the theory of Bragg's law, useful in explaining the invention.

Referring to FIG. 1 the geometrical properties of X-ray diffraction can be analyzed in terms of the spacing of unit cells. The scattering may be described as if various planes 11, 12 of unit cells in a crystal will partially reflect the incident beam. The reflections from successive similar planes will interfere with one another. When conditions are such that the waves interfere constructively, a maximum in the diffraction pattern occurs.

Consider a series of planes 11, 12 in the crystal to be separated by a distance $d$ reflecting radiation 13, 14 of wavelength $\lambda$. FIGURE 1 shows the path difference between the reflections from successive planes to be $2d \sin \theta$. The phase difference between these rays 15, 16 in the reflected wave is $$\phi = \frac{2\pi}{\lambda} \times 2d \sin \theta \qquad (1\text{-}1)$$

The waves will reinforce when $\phi$ is a multiple of $2\pi$. The condition for strong reflection then is $$2d \sin \theta = M\lambda \qquad (1\text{-}2)$$

This is Bragg's law, deduced by W. L. Bragg in 1913. It must be emphasized that Bragg's law depends only on the periodicity of the structure, and makes no reference to the repetition unit composition.

For a randomly selected direction of irradiation, there usually will not be any set of planes satisfying the Bragg law. The crystal is usually rotated around an axis perpendicular to the beam to achieve this condition, or equivalently, the sample to be irradiated is broken into a powder of microcrystallites, where all possible orientations occur and diffraction from optimumly oriented microcrystallites predominates.

Analysis of Pattern

Assuming a single crystal is to be irradiated, the crystal is rotated to get the diffraction maxima to appear. The diffracted wave appears on the photographic film as an array of spots. (For a microcrystalline powder, one does not have spots but rather rings of thickness determined by particle size, etc. Except in cases of extreme symmetry, the information presented is the same in the two methods. In the Lane procedure, in which a whole spectrum of radiation impinges upon a stationary crystal, it is possible to carry out a subsidiary computation and again obtain essentially the same structural data.) From this array, the shape and dimensions of the unit cell can easily be determined, and the plane from which each spot was reflected can be identified. This information can be derived by an experienced crystallographer in a few hours even where the crystal is not a simple one. For this reason, it is not particularly important for a simulator system to duplicate the geometrical properties of the crystal. Also, duplicating the number of diffracting elements in a crystal is usually impractical.

Atomic Scattering Factor

The directions in which radiation is scattered from a crystal is a purely geometrical phenomenon, but the intensity of the diffraction maxima will depend on the nature of the individual scatterers, i.e., the structure of the unit cell.

Figure 2:
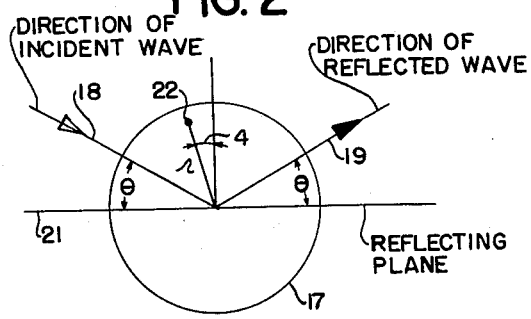
FIGURE 2 is a diagram illustrating the calculation of atomic scattering factors useful in explaining the invention.

An atom does not scatter X-rays as if it were a point object, as the dimensions of the atom are of the order of a wavelength. Referring to FIG. 2 the scattering by a single atom will be a superposition of the scattered waves 19 scattered by all the points in the atom. Because of their mass, the nuclei scatter very little. There are, however, numerous sources of incoherent background scattering, from inelastic single electron processes to multiple X-ray scattering. Further, if the X-ray frequency is not kept away from atomic excitation lines, there is an anomalous scattering intensity.

The path difference for a wave 18 diffracted from a point 22 with coordinates $(r, 4)$ in an atom 17 relative to the center of the atom and its reflecting plane 21 is seen from FIGURE 2 to be $$2r \sin \theta \cos 4 \qquad (2\text{-}1)$$

Then, the phase difference is $$\theta = \frac{4\pi r}{\lambda} \sin \theta \cos \psi \qquad (2\text{-}2)$$

The probability of scattering at a point is proportional to the probability of an electron being at that point, i.e., the density $p(\vec{r})$. The total scattering in the direction $\theta$ will then be proportional to $$f = \int p(r) e^{i\left(\frac{4\pi}{\lambda} r \sin \theta \cos \psi\right)} d\tau \qquad (2\text{-}3)$$

where $d\tau$ is a volume element in the atom.

The factor F is called the atomic scattering factor. According to the invention X-ray scattering is simulated by an object which scatters in the same analytical manner. The position-dependent parameter on which the scattering depends is arranged to effectively duplicate the electron density in atoms. Tables of this electron density exist. It should be noted that the individual atom scatters in all directions.

The scattering by the unit cell is simply a superposition of the scattering by all the atoms that comprise the unit cell. This will also generally consist of finite scattering in all directions. It must be realized that in a molecule the atoms consist of two parts, ion cores and bound electrons. In ionic binding, only ion cores occur, but in other types, the bond electrons constitute separate charge distributions. Their form and positions between the atoms are fairly sharply fixed by the nature of the bond, and since they do not scatter as much as the cores anyway, their exact shape is less important. The sum of all contributions to the unit cell is called the "structure amplitude."

In an X-ray diffraction photograph, it is not the structure amplitude itself which is measured, but only the square of its absolute value, corresponding to radiation density. Thus, phase information is unavailable. Furthermore, due to thermal vibrations of the atoms and molecules of the order of .1 A., some smearing of the intensity results. Hence, the pattern is not sensitive to fine details of the charge distribution. In some molecules, a whole side chain may freely rotate, resulting in a more extensive smearing. The sum is called the "structure amplitude."

The difficult problem of X-ray crystallography is the determination of the contents of the unit cell, and the arrangement of the atoms that comprise it. The usual procedure is to postulate a structure for the unit cell, calculate the relative amplitude for directions of scattering corresponding to the spots in the diffraction pattern, and compare this with the experimental intensities. Then, by a process of trial and error, the correct unit cell is found. Preliminary information is available in that chemical methods at least spell out how many atoms of each type are present, and in organic molecules often identify structural fragments. Even the amplitude information without phase obtained from the scattering allows the charge autocorrelation function to be determined (Patterson method) and in the presence of a heavy atom, gross structural features are then known. However, the ensuing trial and error process is a fairly unsystematic and tedious one, at best.

The simulation system of the present invention will duplicate the scattering by the unit cell. If this is done by duplicating the scattering of the individual atoms, then a proposed unit cell would allow direct measurement of the radiation in directions corresponding to the various reflections. The relative intensities in these directions can be compared to the results of the X-ray measurements. The present invention provides the fundamental requirement of a simulation system, a scattering unit which has the same scattering properties as atoms.

In the X-ray case, a plane wave is scattered by the crystal. At any frequency, a plane wave will be characterized by an electric field, $$\vec{E} = \vec{E}_0 e^{i \vec{k}_0 \cdot \vec{r}} \qquad (3\text{-}1)$$

where $E_0$ is some constant vector, and $\vec{k}$ is vector in the direction of the wave, and $|\vec{k}_0| = 2\pi/\lambda$.

A dielectric medium with variable dielectric constant $\epsilon = \epsilon(r)$ will be used to scatter the wave.

Suppose that $\omega$ is the angular frequency and $\epsilon_1$ and $\mu_0$ the free space dielectric constant and magnetic permeability. In terms of the vector potential $$\vec{A} = \vec{H} = \nabla \times \vec{A}, \quad \nabla \cdot \vec{A} \qquad (3\text{-}2)$$

arbitrary, the first of Maxwell's equations $$\nabla \times \vec{H} = \dot{\vec{D}} \qquad (3\text{-}3)$$

becomes $$\nabla^2 \vec{A} - \nabla \nabla \cdot \vec{A} = -\nabla \times \nabla \times \vec{A} = i\omega \epsilon(r) \vec{E} \qquad (3\text{-}4)$$

while the second, $$\nabla \times \vec{E} = -\dot{\vec{B}} \qquad (3\text{-}5)$$

or $\nabla \times \vec{E} = i\omega \mu \cdot \nabla \times \vec{A}$, implies $\vec{E} = i\omega \mu \cdot \vec{A} + \nabla \phi$, so that if $$\nabla \cdot \vec{A} = -i\omega \epsilon_0 \phi \qquad (3\text{-}6)$$

then $$\omega^2 \epsilon \cdot \mu \cdot \vec{A} + \nabla \nabla \cdot \vec{A} = -i\omega \epsilon_0 \vec{E} \qquad (3\text{-}7)$$

Combining, we have $$(\nabla^2 + \omega^2 \epsilon_0 \mu_0) \vec{A} = i\omega (\epsilon(r) - \epsilon_0) \vec{E} \qquad (3\text{-}8)$$

which is solved in detail in any standard book on electricity which is solved in detail in any standard book on electricity and magnetism, resulting in $$\vec{A} = \vec{A} \cdot - i\omega \int dt' \frac{e^{i\omega \sqrt{\epsilon_0 \mu_0} |\vec{r} - \vec{r}'|}}{4\pi |\vec{r} - \vec{r}'|} \frac{\epsilon(\vec{r}') - \epsilon_0}{\epsilon(\vec{r}')} \vec{D}(\vec{r}') \qquad (3\text{-}9)$$

where $$\vec{A} \cdot = (i/\omega \mu_2) \vec{E}_0 e^{i \vec{k}_0 \cdot \vec{r}} \qquad (3\text{-}10)$$

is the incoming vector potential.

In order to simulate X-ray diffraction, multiple scattering between different atoms of a unit cell must be avoided.

A calculation based on (3–9) shows that for N atoms of mean volume $t$, and mean value S of $$\frac{\epsilon(\vec{r}) - \epsilon_0}{\epsilon(\vec{r})} \qquad (3\text{–}11)$$

with interparticle distances $R_{ij}$, the power ratio of undesirable multiple to desired single scatter is of the order of $$P_2/P_1 \sim S^2 \frac{\pi^2}{N}\left(\frac{t}{\lambda^3}\right)^2 \left(\Sigma \frac{\lambda}{R_{ij}}\right)^L \qquad (3\text{–}12)$$

The maximum acceptable double scatter interference can only be determined by experiment, but it probably restricts S to no more than the order of $10^{-2}$–$10^{-1}$, which suggest the use of foam dielectrics.

If rescatter is very small, then we may choose $$\vec{D} - \vec{D}\cdot = \epsilon_0 \vec{E}_0 e^{i\vec{k}_0 \vec{r}} \qquad (3\text{–}13)$$

in (3–9). In X-ray scattering, target dimensions $|\vec{r'}|$ are very small compared to target to detector distance $|\vec{r}|$, so that the exponent and denominator of (3–9) may be expanded. If this is here the case as well, we then find for the scattering field $$\vec{E}_s = \vec{E} - \vec{E}_0 e^{i\vec{k}_0 \vec{r}} \qquad (3\text{–}14)$$

$$\vec{E}_0 = \frac{k_0^2 e^{ik_0 r}}{4\pi r} \vec{E}_0^\perp \int dt' \left[ \frac{\epsilon(\vec{r'}) - \epsilon_0}{\epsilon(\vec{r'})} \right] e^{i(\vec{k}_0 - \vec{k}_f)\cdot \vec{r'}} \qquad (3\text{–}15)$$

where $\vec{k}_f = k_0 \vec{r}$, $k_0^2 = \omega^2 \epsilon_0 \mu_0$, $$\vec{E}_0 \equiv \vec{E}_0 - r\vec{E}_0\cdot \vec{r} \qquad (3\text{–}16)$$

Figure 3:
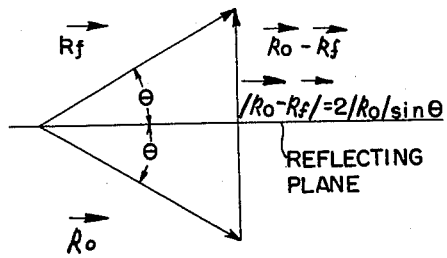
FIGURE 3 is a diagram of vector relationships useful in explaining the invention.

Hence, the structure amplitude has been determined. However, the phase error in the integrand is easily shown to be $\sim \pi r'^2/\lambda r$ and this must certainly be kept below 0.1 to avoid drastic changes in the interference pattern. If the corresponding large target to detector distances are not practical, one may use a microwave lens or reflector to bring the detector effectively to infinity. Since $k_0$ is in the direction of the incident wave, and $k_f$ in the direction of the outgoing wave, we call the angle between them $2\theta$ to maintain the same notation as in the X-ray case. Then, from FIG. 3

$$|\vec{k}_0 - \vec{k}_f| = 2k_0 \sin \theta \qquad (3\text{–}17)$$

And $\vec{k}_0 - \vec{k}_f$ is perpendicular to a plane halfway between $k_0$ and $k_f$. In the X-ray case the $\theta$ was measured from this direction. Then since $$(k_0 - k_f)\cdot r' = |k_0 - k_f| r' \cos \psi \vec{E}_s$$

$$= \frac{k_0^2 e^{ik_0 r}}{4\pi r} E_0 \int d\tau' \left[ \frac{\epsilon(r)}{\epsilon_0} - 1 \right] e^{i\frac{4\pi}{\lambda} r' \sin \theta \cos \psi} \qquad (3\text{–}18)$$

is thus represented as an outgoing spherical wave $$\left( \text{the factor } e^{\frac{ik_0 r}{r}} \right)$$

with an amplitude proportional to some integral. The relative amplitude in any particular direction will be identical with that observed for X-ray if the two integrals are identical. This will be true if two conditions are met:

(1) $\qquad r/\lambda$ is the same in both cases.

This means all the atomic dimensions ideally should be scaled by a factor corresponding to the ratio of the X-ray wavelength and the wavelength at the frequency used. If distances are expressed in terms of the dimensionless variable $$X = \frac{r}{\lambda}$$

then also (2) $\qquad \frac{\epsilon(X)}{\epsilon_0} - 1 \sim \rho(X) \qquad (3\text{–}19)$ and the two integrals for the scattering become exactly proportional.

The scattering in any direction will exactly simulate the X-ray scattering if the proportionality in (3–19) holds, which it does as it is a defining equation for the dielectric constant. Since the mean scattered power per unit solid angle compared to the incident power density may be shown to be of the order of $$P/P_m \; N\left(\frac{2\pi t S}{\lambda^2}\right)^2$$

the feasibility of the simulation is attested to by a required incident power of $100\omega/\text{cm}^2$ in order to achieve a $10^{-4}$ detector power in solid $(.1°)^2$ for 100 atoms, $S \sim 10^{-2}$, and $\lambda = 1$ cm., $t = 1$ cm.$^3$.

Figure 6:
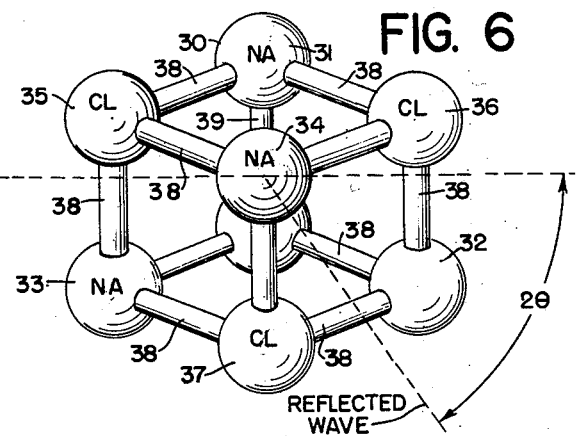
FIGURE 6 is an isometric view of a simulated crystal structure according to the present invention.
Figure 7:
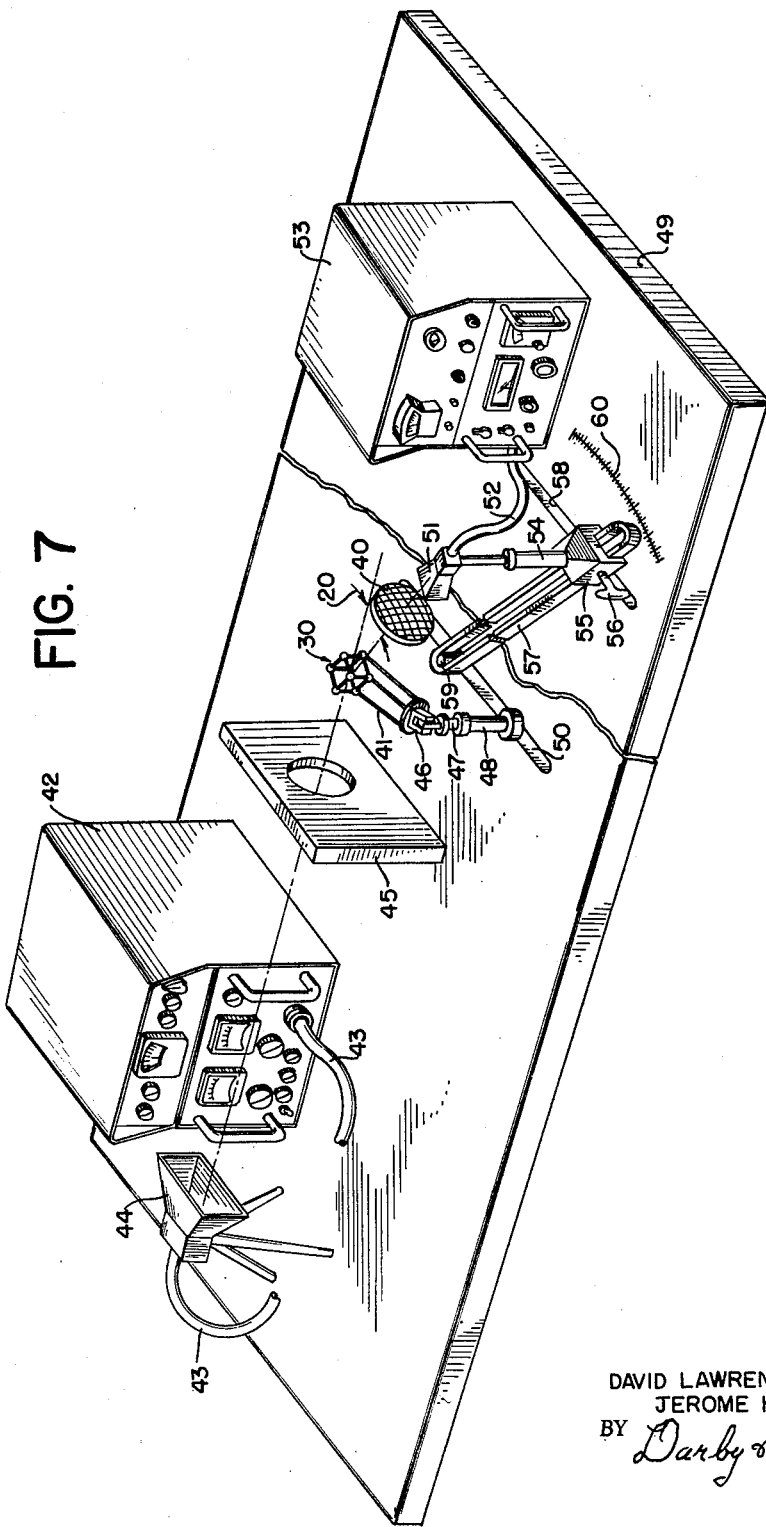
FIGURE 7 is an isometric view of apparatus according to the present invention for simulation of diffraction patterns.

Referring now to FIGURES 6 and 7, exemplary apparatus is shown for carrying out simulation of X-ray diffraction according to the present invention. The simple crystal structure of sodium chloride (NaCl) has been chosen to facilitate explanation of the invention. It will be obvious, however, that corresponding techniques and apparatus can be utilized in the analysis of very complex compounds. Furthermore, while the analysis of simple compounds such as NaCl would not usually yield any previously unknown information, it would be useful for purposes of instruction or demonstration, for example.

FIGURE 6 shows a simulated unit cell of NaCl comprising a cubic structure 30 having four spherical bodies of dielectric material 35, 36, 37 (the fourth is obscured in the drawing). These spherical bodies simulate chlorine atoms and are located at four corners of the cube. Located at opposite corners of the cube are other spherical bodies of dielectric material 31, 32, 33 and 34, which may have a different size and/or composition. These spherical bodies simulate atoms of sodium.

The spheres 31–37 are rigidly supported by relatively small rods 38. The rods 38 are preferably of small diameter and low dielectric constant so that their effect on the impinging radiation will be negligible.

The spacing between centers of atoms in the structure 30 is scaled by the factor by which wavelength of the simulating radiation is greater than the wavelength of the X-rays being simulated. In a typical case the scale factor will be $10^8$ so that X-radiation of 1 angstrom will be simulated by microwave radiation of 1 centimeter (30 kmc.). Unless otherwise stated such scale factor will be assumed in the present explanation.

Substantially collimated monochromatic microwave energy is directed at the crystal-simulating structure 30 by means of a microwave generator 42 connected to transmit from a suitable antenna 44 by means of a transmission line 43. The microwave generator 42 may be of conventional type and will normally be supplied with frequency and amplitude controls and suitable monitoring meters so that a desired frequency and amplitude of radiation can be achieved and maintained. The antenna 44 is illustrated as a horn-type antenna, but of course other types may be utilized if desired.

A shield 45 of resistive microwave absorbing material may optionally be provided to limit the beam to the simulated crystal structure 30 and hence effectively eliminate spurious reflections from supports and the like. The presence of small values of signal amplitude not due to the structure 30 may readily be compensated by measuring such signal with structure 30 removed. This background signal may be subtracted from the desired signal intensity by first rendering it incoherent, for example, by moving the target through one-half wave length and averaging the intensity.

The structure 30 is mounted by means of rods 41 on a base 46. The rods 41 may be of similar configuration to previously described rods 38.

The base 46 is mounted for universal rotation by means of a post 47 and a column 48. The post 47 telescopes within column 48 to allow raising and lowering of the base 46. Transverse adjustability is provided by the slot 50 in the apparatus platform 49.

As previously explained, the angular displacement of diffraction spots (but not their relative amplitude) is determined by the geometric properties of a crystal, and since these properties are readily determined by calculation, it is not the purpose of this apparatus (nor within its capabilities as illustrated) to make such a determination. Accordingly the angular location of diffraction spots is determined in advance by the usual technique and the receiver antenna 51 is arranged at an angle $2\theta$ to determine the relative amplitude of a diffraction spot whose simulated intensity is to be determined. The antenna 51 is connected by a transmission line 52 to a conventional microwave receiver 53.

A microwave lens 40 is disposed in front of receiver antenna 51 in order that the receiver may be considered to be effectively at infinity, thus providing a large target-to-detector distance which is desirable for the reasons expained hereinbefore. Obviously, a reflector could be substituted for the lens 40. For example, an off-axis parabolic reflector would achieve the desired optical transformation. The optical path would obviously be somewhat different in the case of a reflector, but such alterations in design would be well within the skill of the art.

Adjustability of the receiving antenna 51 is provided by a stand 54 mounted on a base 55 which is in turn secured to a pivotable slide 57. A thumb screw 56 secures the base 55 at a desired location along the pivotable slide 57. The slide 57 is secured to the platform 49 by a pivot 59 and a slider (not shown) riding in slot 58. A scale 60 indicating the angle of propagation of diffracted radiation is provided on platform 49 to facilitate the positioning of receiving antenna 51. The scale 60 may be calibrated in any desired fashion and may be arranged to be movable thus providing a settable zero point. It may further be noted that the scale 60 should be coordinated with the angular position of the structure 30. Numerous variations in the mechanical support and orientation will be apparent to those skilled in the art. It may be noted, for example, that both source and detector may be rotated and provision could be made for continuous automatic rotation and appropriate geometric intensity factor compensation to provide spots or rings on an oscilloscope directly comparable to an X-ray diffraction pattern for direct comparison by a technician.

It should be noted that the simulated crystal structure 30 will orient so that the effective reflecting surface 39 resides at an angle $\theta$ with respect to the axes of each of the receiving and transmitting antennas 44 and 51.

While it is clear from the previous description how the apparatus of 6 and 7 will be utilized to measure the relative intensity of specific diffraction spots of a crystal, it will perhaps be helpful in understanding the advantages of the invention to describe the general procedure to be utilized in accordance with the invention to analyze a particular compound.

Prior to commencing use of the apparatus disclosed, the investigator will have certain information. First he will have an actual X-ray diffraction pattern of the compound being investigated and a tabulation of the diffraction spots with their angle and relative intensity. The geometrical properties of the substance will have been determined by the usual mathematical analysis. The shape and dimensions of the unit cell will therefore be known and the plane from which each spot was reflected will be identified.

Chemical analysis will have provided information regarding the number of atoms of each element present in the unit cell.

With the foregoing information the apparatus of FIGURES 6 and 7 will be utilized to construct models of likely arrangements of the atomic elements in the unit cell and to determine the relative intensity of the diffraction spots. These may then be compared with the actual X-ray diffraction data to determine whether the hypothecated structure is the same as the compound under study.

From the foregoing it will be seen that the crystallographer can construct a model from a collection of the appropriate number of simulated atoms of the respective elements involved and can measure sufficient relative intensities of respective diffraction spots to determine whether the hypothecated structure is correct all in a relative short time. Much time can be saved by this procedure over the exceedingly tedious computation required to compute such relative intensities.

It will thus be understood that apparatus of the present type provided for general investigation of chemical compounds will include a substantial number of simulated atoms of all commonly encountered elements together with appropriate structure for assembling them into model unit cells including rods 38 and 41 as illustrated in FIGURES 6 or 7 or their functional equivalents. The model unit cells may be constructed by utilizing adhesives or alternatively the atoms may be as illustrated provided with shallow apertures such that the rods 38 and atoms 31–37 may be press-fit together to build up the desired structure.

It has been seen that simulated atoms of different elements may have different dimensions or different composition or both. The simulated atom of each element should have a scattering characteristic corresponding to the atomic scattering factor of the element which it simulates. The parameters with which one has to work to accomplish this objective are principally the dimensions of the material and the dielectric constant of the material forming the simulated atom. While the shape could be other than spherical, the spherical shape is preferable from the point of view of simplicity. The various forms of simulated atoms could be designed on a purely empirical basis by simply selecting the size and composition of sphere from a large variety of samples to best approximate the atomic scattering factor of each particular element required. Dielectric materials in a variety of values of dielectric constant are readily available, (e.g. Stycast and Eccostock sold by Emerson and Cuming, Inc., Canton, Mass.).

However, the design of suitable simulated atoms is perhaps more expeditiously accomplished by an analytical approach. We have seen that ideally the dielectric scatterers which simulate atoms should have a polarizability $X(r)$ proportional to the atomic charge density $\rho(r)$. Since $\rho(r)$ is a complicated function for atoms larger than hydrogen, it is more feasible to approximate the atomic scattering factor by the use of a geometry for the dielectric which is more readily constructed. As long as the scattering by the simplified dielectric structure is a good approximation to the scattering by the atom, the substitution is valid.

One of the simplest structures is a homogeneous dielectric sphere of radius R and polarizability $X_0$. In general, the dielectric scatering factor is from (3–18)

$$f(\theta) = \frac{k_0^2}{4\pi} \int d\tau X(r) e^{ik_0 r \sin \theta \cos \psi} \qquad (4\text{–}1)$$

For a homogeneous sphere $X(r) = X_0$ for $r \leq R$ and for $r > R$. Then, $$f(\theta) = \frac{X_0 k_0^2}{4\pi} \int_0^R r^2 dr \int_0^\pi d\psi e^{i2k_0 r \sin \theta \cos \psi} \sin \psi \int_0^{2\pi} d\phi \qquad (4\text{–}2)$$

where the limits integrate over the sphere. The integration over $d\phi$ is trivial. To perform the $\psi$ integration, let $\beta = -\cos\psi$, and $\mu = 2k_0 \sin\theta$. Then $d\beta \sin\psi d\psi$, and (4-2) becomes $$f = \frac{X_0 k_0^2}{2} \int_0^R r^2 dr \int_{-1}^{+1} e^{-i\mu r \beta} d\beta \qquad (4-3)$$

$$= \frac{X_0 k_0^2}{2} \int_0^R r^2 dr \frac{e^{i\mu r} - e^{-i\mu r}}{i\mu r} \qquad (4-4)$$

$$= X_0 k_0^2 \int_0^R r^2 dr \frac{\sin \mu r}{\mu r} \qquad (4-5)$$

Note that for $\theta = 0$, $\mu = 0$, and $$\sin\frac{\mu r}{\mu r} = 1$$

Then, $$f(0) = \frac{k_0^2 X_0 R^3}{3} = \frac{X_0}{3k_0}(k_0 R)^3 \qquad (4-6)$$

and $$f(\theta) = \frac{X_0}{k_0}(k_0 R)^3$$

$$\left[\frac{\sin(2k_0 R \sin\theta) - 2k_0 R \sin\theta \cos(2k_0 R \sin\theta)}{(2k_0 R \sin\theta)^3}\right]$$

$$(4-7)$$

There are only two variable parameters in this expression, the polarizability $X_0$ and the product $k_0 R$; $X_0$ just affects the total scattering, so matching of the expression (4-8) to atomic scattering factors requires an appropriate choice of $k_0 R$.

Figure 4:
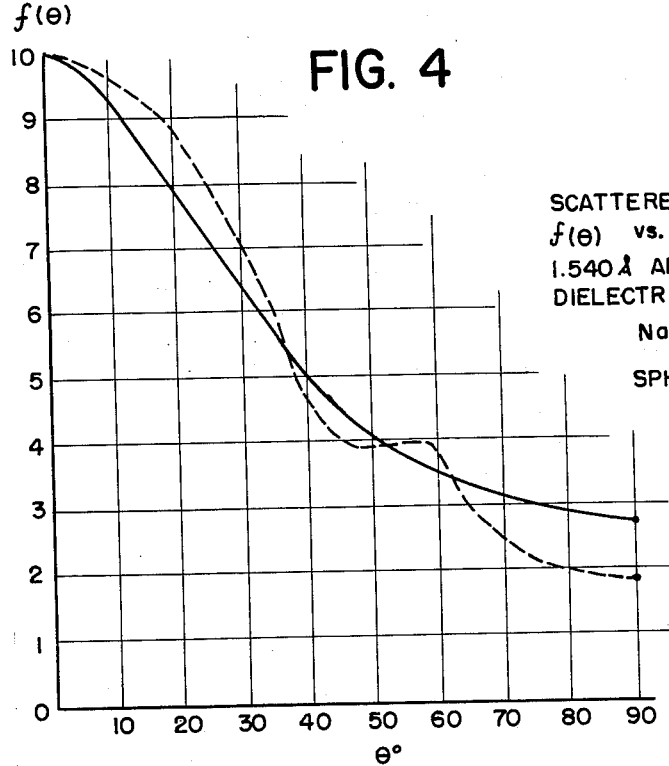
FIGURE 4 is a graph comparing an actual scattering characteristic and a simulated characteristic.

Table I shows a calculation of the term in brackets in equation (4-8) for $k_0 R = 1.8$, a value which was chosen from among several other values to give the best fit with the atomic scattering factor for the sodium ion. FIG. 4 shows these two curves compared, where the sodium scattering factor is at 1.540 A., one of the most common X-ray wavelengths.

TABLE I [1]

| $\theta$ | A $\sin\theta$ | B $k_0 R \sin\theta$ | C $\sin^\circ$ | D $\sin C$ | E $\cos C$ | F $B \cos C$ | G $D-F$ | H $B^3$ | I $G/H$ | J [2] $30I$ |
|---|---|---|---|---|---|---|---|---|---|---|
| 0 | 0 | 0 | 0 | 0 | 1.000 | 0 | 0 | 0 | .333 | 10 |
| 15° | .258 | 0.929 | 53 | .800 | .600 | .557 | .243 | .802 | .310 | 9.30 |
| 30° | .500 | 1.800 | 103 | .972 | -.224 | -.403 | 1.375 | 5.83 | .236 | 7.08 |
| 45° | .707 | 2.545 | 123 | .839 | -.544 | -1.383 | 2.222 | 16.5 | .134 | 4.02 |
| 60° | .866 | 3.118 | 176 | .070 | -.997 | -3.03 | 3.73 | 30.2 | .126 | 3.78 |
| 75° | .965 | 3.476 | 199 | -.326 | -.945 | -3.26 | 2.93 | 42.0 | .0698 | 2.09 |
| 90° | 1.000 | 3.600 | 206 | -.437 | -.899 | -3.23 | 2.79 | 46.7 | .0612 | 1.83 |

[1] Calculation of $\frac{\sin x - x \cos x}{x^3}$ where $x = R_0 R \sin\theta$.

[2] Column J represents the function normalized to be equal to the value for sodium at $\theta = 0$.

The fit to the curve for Na+ is satisfactory, but some improvement on this is obtainable, if desired, by construction of two-layered spheres, the inner parts, of higher dielectric constant, serving to mimic the high-density atomic core.

The diameter of the sodium ion simulator is determined by the relation $k_0 R = 1.8$. Since $k_0 = 2\pi/\lambda$ $$R = \frac{1.8}{2\pi}\lambda = 0.29\lambda$$

Thus, if a simulation frequency of 30 kmc. is used, the dielectric spheres to simulate sodium would have a diameter of 0.58 cm.

Figure 5:
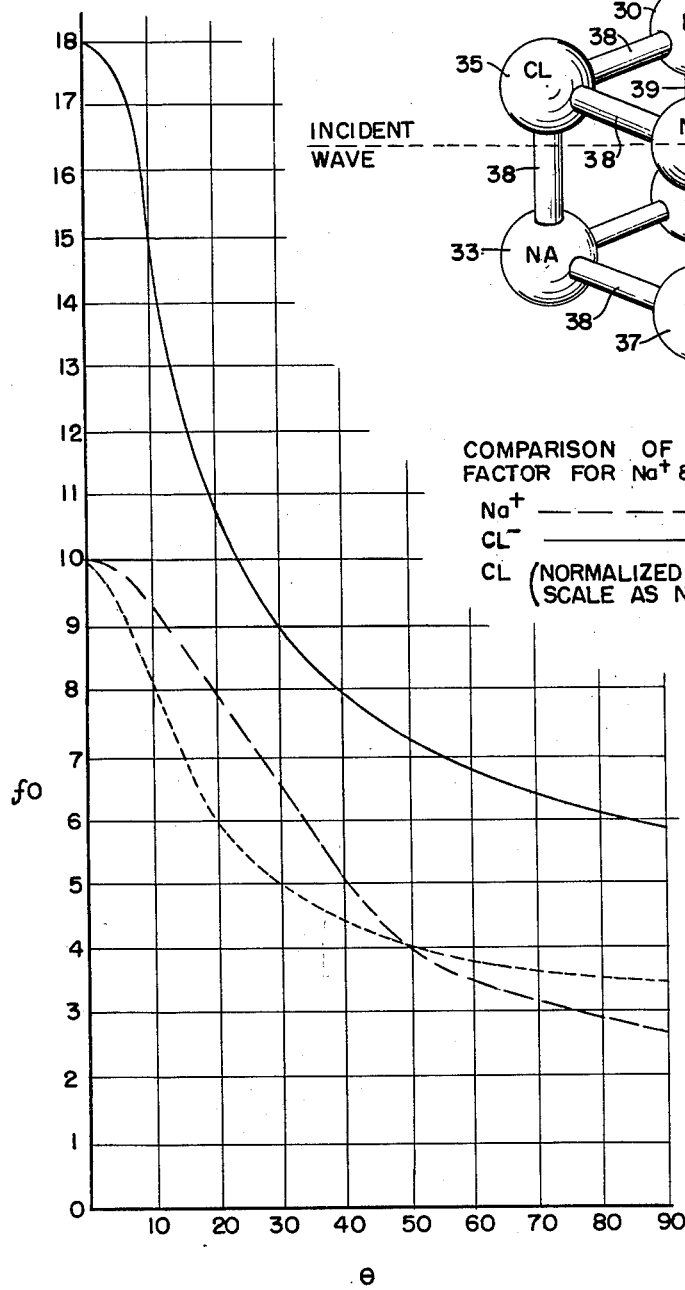
FIGURE 5 is a comparison of atomic scattering factors of $Na^+$ and $Cl^-$ useful in explaining the invention.

The atomic scattering factors of other elements have the same general shape as that for the sodium ion. FIGURE 5 shows the sodium and chlorine ions compared in actual scale and normalized to the same scale for comparison of shape. By selecting the best of several other prospective radii according to calculations similar to that illustrated in Table I, the chlorine curve can be duplicated by a homogeneous sphere also. The difference in absolute magnitude of $f(\theta)$ from one atom to another can be adjusted by choosing a siutable dielectric constant for each dielectric sphere, higher dielectric constant yielding a greater amplitude.

From the foregoing description it will be seen that an apparatus and method is described for determining the relative amplitude of diffraction maxima of hypothecated crystal structures which is substantially less time consuming than the tedious computation previously required (even with modern electronic computer apparatus).

It should also be appreciated that the method and apparatus disclosed has advantages over computational methods in that it facilitates visualization of the problem and tends to prevent mechanical or clerical errors. For example models which could not exist for spatial reasons cannot be constructed in the scale model of the present invention.

While various modifications and variations have been suggested in the course of the description, it should be pointed out that the invention is not limited in scope to the specific embodiments described or suggested. For example, radio frequency wavelengths on the order of one centimeter have been suggested for simulation purposes; it is feasible to use different wavelengths. With large complex molecules, it may be practical to use shorter radio frequency wavelengths extending possibly to the infrared. When the invention is considered in this broader aspect it may be appropriate to consider the characteristic of the material of the model affecting scattering to be the index of refraction rather than the dielectric constant.

It should also be appreciated that the apparatus has been described in a relatively simple form and that more complex apparatus could be utilized to increase the efficiency, for example, by using multiple receiver antennas and/or automatically rotating the model to the desired angles. It will be understood therefore that such refinements together with automatic recording equipment and other known techniques could be utilized to increase the speed and efficiency of the apparatus disclosed and are within the scope of the invention.

In addition to all the previously suggested modifications and variations, other variations will be apparent to those of ordinary skill in the art and it is accordingly desired that the scope of the invention not be limited to those embodiments disclosed nor to the several variations and modifications suggested but that the scope of the invention be limited only by the appended claims.

What is claimed is:

1. Apparatus for generating an electromagnetic radiation diffraction pattern with radiation of wavelength substantially greater than X-ray wavelengths, said pattern simulating in relative amplitudes in specific directions the X-ray diffraction pattern of a crystal of selected composition and configuration, said apparatus comprising means for generating and projecting along a predetermined axis a substantially collimated beam of electromagnetic radiation having a wavelength substantially greater than X-ray wavelengths, an ordered assembly of bodies of material having a predetermined dielectric constant different than that of the surrounding medium, said assembly being arranged in a configuration geometrically similar with that of the atoms of a unit cell of said crystal and means for selectively measuring the relative intensity of radiation scattered from said assembly at predetermined angles with respect to said predetermined axis and with respect to effective reflecting surfaces of said assembly.

2. Apparatus as claimed in claim 1 wherein said bodies of material are supported by bond-simulating connecting members.

3. Apparatus as claimed in claim 1 wherein said apparatus radiates and measures electromagnetic energy of a wavelength between approximately 0.1 and 10 cm.

4. Apparatus as claimed in claim 1 wherein said generating means generates and projects a substantially monochromatic beam of electromagnetic radiation.

5. Apparatus for generating an electromagnetic radiation diffraction pattern with radiation of wavelength substantially greater than X-ray wavelengths, said pattern simulating in relative amplitudes in specific directions the X-ray diffraction pattern of a crystal of selected composition and configuration, said apparatus comprising means for generating and projecting along a predetermined axis a substantially monochromatic, collimated, beam of electromagnetic radiation having a wavelength substantially greater than X-ray wavelengths, an ordered assembly of spherical bodies of material having predetermined dielectric constant different than that of air, said assembly being arranged in a configuration geometrically similar with that of the atoms of a unit cell of said crystal and on a scale of $\lambda_A:\lambda_X$ where $\lambda_A$ is the wavelength of the apparatus radiation and $\lambda_X$ is the wavelength of the X-ray radiation being simulated, and means for selectively measuring the relative intensity of radiation scattered from said assembly at predetermined angles with respect to said predetermined axis and with respect to effective reflecting surfaces of said assembly.

6. Apparatus for generating an electromagnetic radiation diffraction pattern with radiation of wavelength substantially greater than X-ray wavelengths, said pattern simulating in relative amplitudes in specific directions the X-ray diffraction pattern of a crystal of selected composition and configuration, said apparatus comprising means for generating and projecting along a predetermined axis a substantially monochromatic, collimated, beam of electromagnetic radiation having a wavelength between approximately 0.1 and 10 cm., an ordered assembly of spherical bodies of material having a predetermined dielectric constant different than that of air and having respectively at least two different diameters providing simulation of atoms of different elements, said assembly being arranged in a configuration geometrically similar with that of the atoms of a unit cell of said crystal with said bodies of material supported by relatively small cross section, low dielectric constant, rods and on a scale of $\lambda_A:\lambda_X$ where $\lambda_A$ is the wavelength of the apparatus radiation and $\lambda_X$ is the wavelength of the X-ray radiation being simulated, and means for selectively measuring the relative intensity of radiation scattered from said assembly at predetermined angles with respect to said predetermined axis and with respect to effective reflecting surfaces of said assembly.

References Cited in the file of this patent
UNITED STATES PATENTS

| | | |
|---|---|---|
| 2,633,017 | Smoluchowski | Mar. 31, 1953 |
| 2,727,153 | Coltman | Dec. 13, 1955 |
| 2,816,234 | Ellis | Dec. 10, 1957 |
| 2,851,884 | Arenberg | Sept. 16, 1958 |
| 2,973,687 | Pennington et al. | Mar. 7, 1961 |